United States Patent
Shaver et al.

(10) Patent No.: US 11,194,075 B2
(45) Date of Patent: Dec. 7, 2021

(54) STORM DETECTION APPARATUS AND METHOD

(71) Applicants: Edward F. Shaver, Lutz, FL (US); Pavel Goldman, Hollywood, FL (US)

(72) Inventors: Edward F. Shaver, Lutz, FL (US); Pavel Goldman, Hollywood, FL (US)

(73) Assignee: Entropy Technology Design, Inc., Lutz, FL (US)

( * ) Notice: Subject to any disclaimer, the term of this patent is extended or adjusted under 35 U.S.C. 154(b) by 0 days.

(21) Appl. No.: 16/899,735

(22) Filed: Jun. 12, 2020

(65) Prior Publication Data

US 2020/0393597 A1 Dec. 17, 2020

Related U.S. Application Data

(60) Provisional application No. 62/860,879, filed on Jun. 13, 2019.

(51) Int. Cl.
| | | |
|---|---|---|
| *G01W 1/16* | (2006.01) | |
| *G05D 1/10* | (2006.01) | |
| *G01W 1/10* | (2006.01) | |

(52) U.S. Cl.
CPC ............... *G01W 1/16* (2013.01); *G01W 1/10* (2013.01); *G05D 1/1062* (2019.05)

(58) Field of Classification Search
CPC ......... G01W 1/16; G01W 1/10; G05D 1/1062
See application file for complete search history.

(56) References Cited

U.S. PATENT DOCUMENTS

| | | |
|---|---|---|
| 4,873,483 A | 10/1989 | Ostrander |
| 5,541,501 A | 7/1996 | Shaver et al. |
| 6,791,311 B2 | 9/2004 | Murphy et al. |
| 7,254,484 B2 | 8/2007 | Jantunen et al. |
| 2019/0196062 A1* | 6/2019 | Coleman ................. G01W 1/16 |

* cited by examiner

*Primary Examiner* — Curtis B Odom
(74) *Attorney, Agent, or Firm* — Harpman & Harpman

(57) ABSTRACT

A mobile self-contained real-time storm and related events detection and tracking device utilizing a tunable multiple channel antenna array for multiple angle signal detection. High resolution data generated by movement of detected charged concentrations within a storm or pre-storm weather system is collected and displayed in real-time with bearing directional and distance alerts. Telemetric cloud-based network by multiple remote users to extend detection and enhanced detection and alerts generating capabilities. Mounting variations of multiple channel antenna array on varied mobile platforms allows for creation of regional detection and alert networks.

7 Claims, 2 Drawing Sheets

STORM DETECTION APPARATUS AND METHOD

BACKGROUND OF THE INVENTION

1. Technical Field

This device is related to the field of storm detection, specifically thunderstorms and sensors that are responsive to lightning discharge amplitude and radiation fields produced by storm generated lightning discharge parameters.

2. Description of Prior Art

Prior art systems and methodology have been directed for lightning detection using a variety of processes, see for example U.S. Pat. Nos. 4,806,851, 4,873,483, 5,541,501, 6,791,311, and 7,254,484.

U.S. Pat. No. 4,873,483 discloses a detection system with a map-like display for determining distance from observed location to source by ratio of intensity of multiple comparison analysis.

U.S. Pat. No. 5,541,501 claims a lightning and storm warning method and apparatus using two frequencies generated by discharge for relative amplitude outflow for two channel receivers.

U.S. Pat. No. 6,791,311 discloses a lightning and data acquisition system using a number of remote fixed sensors to detect cloud to ground lightning strikes.

Finally, U.S. Pat. No. 7,254,484 is directed towards the detection of lightning wherein a mobile lightning detector is provided with an antenna, amplifier having an A/D converter and a digital signal processor.

SUMMARY OF THE INVENTION

A mobile self-contained origin specific storm detection apparatus utilizing real-time predictive data collection and proprietary analyzation methodology through storm related physical parameters. A detection and analysis comparison of radiated field signals created in a storm or pre-storm formation conditions by the charge flow between both charge separation layers within the cloud structure, or from the cloud to ground as in a typical lightning ground strike; a determination of storm strength and development phase; determination of both directional and altitude relative to observer can be accomplished. Multiple ferrite antennas with various configurations allows for effective operative detection in a four or greater channel "quad-matrix array" for both amplitude and signal plurality capture and comparison of critical lightning event location and to determine the geometry of the ionization channel generating the detected signal.

DETAILED DESCRIPTION OF THE INVENTION

Figure 3:
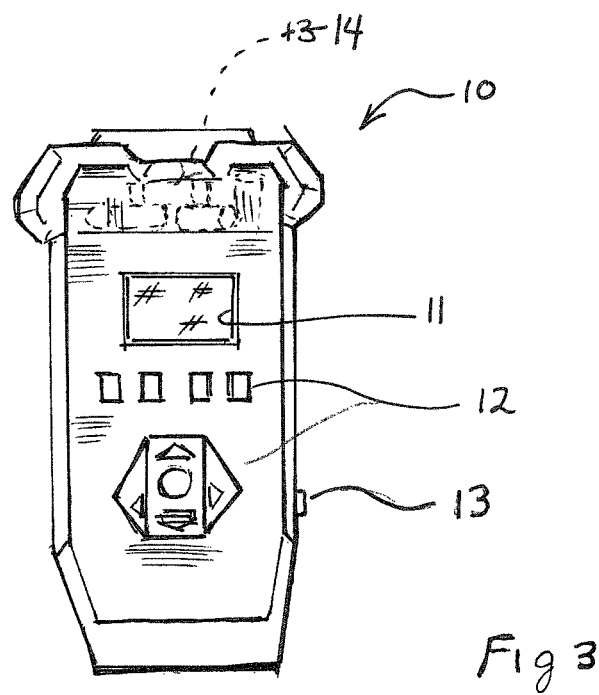
FIG. 3 is a top plan view of the physical configuration of the lightning detection device.

A real-time storm, lightning, and pre-lightning detection device 10 of the invention which can be configured in a variety of mobile or fixed applications. FIG. 3 depicts a mobile, handheld configuration having an external information display 11, functional control input push button switches and indicators 12 with a USB access data communication and charging port 13. A variation of the device intended for mobile application of drones or aircraft would include a capability to output the collected data and analysis to other external or remote display systems.

Figure 1:
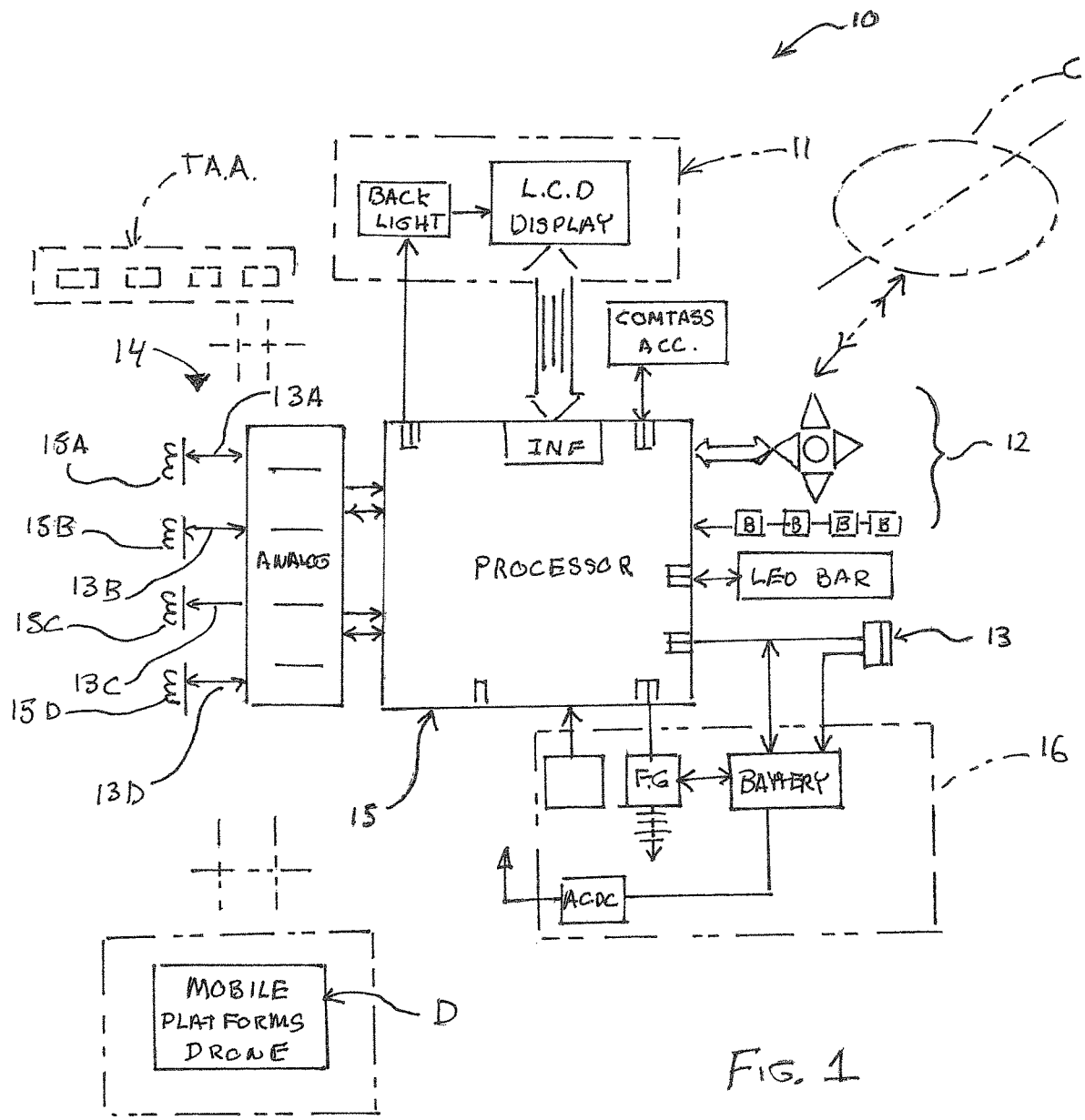
FIG. 1 is a graphic block flow diagram of the basic four-channel version of the quad-matrix detection array.

Referring now to FIG. 1 of the drawings, the detection 10 device includes an antenna array 14 of multiple ferrite-driven channels. The basic quad-matrix array consists of four channels 13A, 13B, 13C and 13D for detection of real-time magnetic field events produced by charge movement within the cloud or storm formation. The antenna array 14 is in communication with a central micro-processor 15 which performs A/D conversion of the analog signals, synchronizes all incoming data, and performs analysis to identify important defined signal activity indicative of a variety of lightning and storm conditions. The detection device 10 can accurately determine the actual geometry of the ionization channel IC created by lightning and pre-lightning events, including cloud-to-ground, cloud-to-cloud, and pre-lightning events as they occur. This information is used to create a model of the storm and important storm parameters including distance, movement relative to observer, development of special conditions such as pre-tornado conditions, and other storm-related parameters. A more detailed discussion of these analysis functions will be disclosed in greater detail hereinafter.

The antenna array 14 shown in this example is comprised of four ferrite antennas 15A, 15B, 15C, and 15D each tuned to a specific predefined detection frequency. Antenna orientation provides for multiple angle signal detection defining a three-dimensional rotation. Signal amplitude, polarity, duration, and relative strength must be captured simultaneously for effective operation. It is noted that current detection systems are incapable of such multi-channel signal delineation and comparison.

The processor 15 utilizes a micro-controller to adjust the independent amplification of the multiple antennas 15A, 15B, 15C and 15D so operation of the antenna array can be adjusted based on several different parameters which allows for operation of the device in different operating environments. A critical use of the micro-controller for making continual adjustments of the operational detection parameters is in drone or aircraft-mounted applications where a dynamic control of the detection functions is required for accuracy. It is noted that this is an additional function of the device which is not found in current lightning detection systems.

The tuning of the multi-channel array involves the selection of center-frequency relative gain between channels and relative gain between additional multi-channel arrays which may be employed in certain applications. An additional tuning function involves the selection of the physical orientation between the elements of the array. The operational characteristics of the array elements, along with their orientation relative to each other, provides the ability to determine the geometry of the ionization channel IC. The determination of this geometry in turn allows for adjustments to parameters used to determine the intrinsic strength and type of discharge being detected.

Figure 2:
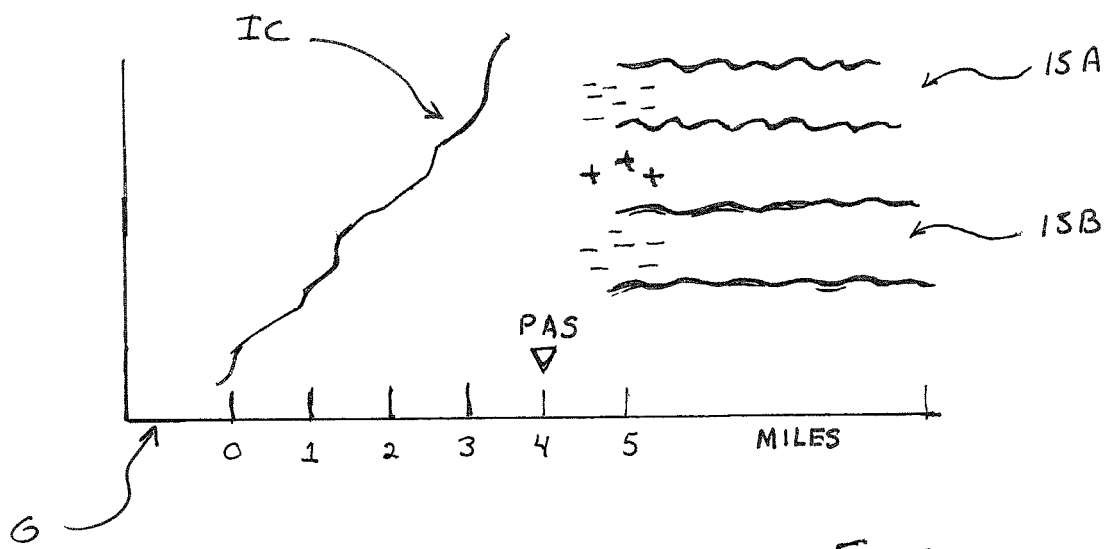
FIG. 2 is a graphic depiction of lightning ionization channel orientation.

The detection and analysis of the geometry of the ionization channel IC is therefore critical to accurate and predictive determination of storm, lightning, and pre-lightning activity, as noted. Given that the average length of the ionization channel in a typical cloud-to-ground lightning stroke tan exceed six miles in length, it will be seen therefore that the accurate determination of the actual length and orientation of the ionization channel is a key element to determining the actual versus observed strength of a particular radiated event, since there is a direct physical relation between the actual length of the ionization channel and the strength of the radiated signal, as seen in FIG. 2 of the drawings.

It will be evident therefore that the analysis and determination of the geometry of the ionization channel with respect to the observer affects the final apparent length of the radiator, as well as determining the actual versus the apparent signal strength. As noted, the detection device 10 described herein of the invention has the unique ability to determine the true geometry of the ionization channel which does not exist in current prior art systems. For example, cloud-to-cloud and cloud-to-ground lightning ionization channels differ. In cloud-to-cloud lightning, the ionization channels run primarily at a deflection angle to the ground G, as shown in FIG. 2.

Correspondingly, cloud-to-ground ionization channels typically have portions that will approach the ninety-degree angle as well as having low-angle deflection portions. In addition, other important types of charge movement that are used to detect pre-lightning and developing storm conditions have ionization channels that are poorly defined, and in this case, it is the absence of an ionization channel signature that is significant. Current detection systems are not capable of such real-time accurate actual delineation and analysis of the ionization channel given the reliance of fixed approximations of channel length and orientation to provide a "best-average" ranging function in all conditions. This leads to inaccuracy especially in situations where the actual ionization channel is coming directly toward or away from the observer. As mentioned above, such systems are also incapable of recognizing critical events which lack a well-defined ionization channel due to their physical structure. Thereby the detection device 10 of the invention allows certain storm and lightning-related physical parameters to be detected in real-time without the heretofore need to cross-referencing available large-scale weather information systems, such as regional radar. The capability of the invention is important in applications such as the navigation and control of unmanned drones which requires real-time access to local weather conditions in the immediate vicinity of the vehicle.

The accuracy provided by the detection device 10 can only be accomplished by the detection of signals from all parts of the ionization channel and determining the relative amount of energy being produced by the various horizontal and vertical components. In addition, the absence of a clearly defined ionization channel signature is an indicator of other conditions that are of significance in accurately defining the storm and weather conditions being detected.

The present invention provides for detection of fast-transient events that are generated by storm, lightning, and pre-lightning conditions. The data field created by the present invention contains critical elements which allow the detection of violent embedded storm elements, such as hail, wind surge, and tornadoes. These violent events are accompanied by the radiated energy fields detected by the present invention, all of which are detected as a result of the analysis of the real-time date stream produced by the quad-matrix array, and the determination of the geometry of the resulting ionization channels. The resulting radiation field signals, which are produced by charge movement between the various layers in developing or active storms, can only be accurately detected and analyzed by the synchronized comparison across the multiple channels possible with the basic form of the invention shown in 13, or in other enhanced versions which include additional detection channels. A source of power and other control circuitry required can be seen within the area 16 of FIG. 1 of the drawings.

It will be evident that the disclosed detection technology can be applied to a variety of non-weather related applications given the basic ability to detect fast-transient events and apply geometric analysis to the detected signals. In fact, the capability of the invention to assign a geometry to a signal source of any time duration allows the technology to detect any source that moves against background. While the primary application of the invention as described herein is for the detection of very fact lightning and pre-lightning radiated fields, the method of building a moving ionization channel can be used to detect much slower moving events, such as unmanned drones as they fly and generate low frequency magnetic signatures produced by the electric motors driving their propellers. In this case, the over-all duration of the event will be a function of seconds rather than micro-seconds, but the use of the detection of the geometry of the signal over time remains a key part of the detection process. Another application concerns the detection of the fields generated by incoming mortar rounds as they activate ground-seeking radar. The net result is again an ionization channel that occurs over a period of 20-30 seconds, which the current invention can detect by an adjustment of the time constants used to define a detected event.

There are several functions related to the survey of potential damage resulting from severe weather that are only possible with access to the basic data from the invention in order to be practical. These related functions include the mapping and survey of existing industrial/commercial systems, such as utility grids, industrial plants, and large infrastructure installations, which may have normal operations disrupted by local severe weather, including lightning. The real-time location of severe weather combined with variations of the basic magnetic field detection functions of the invention allows for this type of survey function to be performed in real-time.

It will be evident that such extended detection applications as tornadic indicators requiring additional antenna arrays T.A.A. and mobile aerial platforms/drones D are within the scope of the disclosure.

It will thus be seen that a new and novel apparatus and system for the detection of a variety of geometrically-radiated field events has been illustrated and described. The events which can be detected and analyzed include storms, lightning, pre-lightning, and a number of non-weather events such as moving drones and mortar rounds. In each case, it is the capability to detect the presence and geometry of an ionization channel that allows the invention to provide critical information about the presence, direction, and movement of an event. It will be apparent to those skilled in the art that various changes and modifications may be made thereto without departing from the spirit of the invention.

Therefore, I claim:

1. A portable magnetic field storm detection device comprising, a multi-channel sensor array in spacially orientation for collecting real-time low frequency magnetic field storm emissions in a three-dimensional data representation of incoming wave-fronts data signals,
   a micro processor for,
   analog to digital conversion of said data signals, adjusting independent amplification of said multi-channel sensor array, compiling said data representations into a matrix array,
synchronized relative signal strength of multi-data collection channels in operable isolation independent of outside data source,
calculating distance, directional bearing and relative motion to the detection device, and display of radiate events positional orientation in real-time thereto.

2. The magnetic field storm detection device set forth in claim 1 wherein said compiled real-time matrix array data includes,
a plurality of incoming data signals from said multi-data collection channels,
analysis of spatially dependent parameters for determination of geometry of defined lightning ionization channels by said microprocessor.

3. The magnetic field storm detection device set forth in claim 1 wherein incoming data signals calculates distance to location of a lightning ground strike corrected for actual spacial geometry of a lightning ionization channel.

4. The magnetic field storm detection device set forth in claim 1 wherein said multi-channel sensor array comprises,
multiple ferrite antennas, each tuned to a specific predefined detection frequency.

5. The portable magnetic field storm detection device set forth in claim 1 which further comprises,
aerial mobile platforms of aircraft, unmanned drone including,
onboard inflight analysis of a directed lightning ionization channel geometry and multiple events,
calculating distance bearing and relative motion integrated with aerial platform navigation to provide real-time inflight course avoidance adjustment.

6. The portable magnetic field storm detection device set forth in claim 5 wherein said aerial mobile platforms communicate with remote sensor receivers providing real-time interlinking of storm data analysis and location displays.

7. The portable magnetic field storm detection device set forth in claim 1 further comprises,
detection of active tornadic and pre-tornadic activity, having at least four added multi-data channels to collect radiated emission from a primary charge layer in a storm cell for,
delivering degree of spacial deformation as an indication of tornadic probability.

* * * * *